United States Patent
Joshi et al.

(10) Patent No.: US 9,973,491 B2
(45) Date of Patent: May 15, 2018

(54) DETERMINING AN IDENTITY OF A THIRD-PARTY USER IN AN SAML IMPLEMENTATION OF A WEB-SERVICE

(75) Inventors: Rahul Joshi, Dublin, CA (US); Wellen Lau, San Ramon, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 2249 days.

(21) Appl. No.: 12/122,422

(22) Filed: May 16, 2008

(65) Prior Publication Data
US 2009/0288155 A1 Nov. 19, 2009

(51) Int. Cl.
H04L 29/06 (2006.01)
G06F 21/31 (2013.01)
H04L 9/32 (2006.01)

(52) U.S. Cl.
CPC .......... *H04L 63/0823* (2013.01); *G06F 21/31* (2013.01); *H04L 9/321* (2013.01); *H04L 9/3263* (2013.01)

(58) Field of Classification Search
CPC ... H04L 63/0823; H04L 9/321; H04L 9/3263; G06F 21/31
USPC ......... 726/2, 3, 4, 9, 10; 713/150, 155, 156; 709/223–226
See application file for complete search history.

(56) References Cited

U.S. PATENT DOCUMENTS

| | | | |
|---|---|---|---|
| 7,840,804 B2* | 11/2010 | Oikawa | G06F 21/31 380/277 |
| 2003/0018913 A1* | 1/2003 | Brezak | G06F 21/31 726/4 |
| 2003/0149781 A1* | 8/2003 | Yared et al. | 709/229 |
| 2004/0139319 A1* | 7/2004 | Favazza et al. | 713/168 |
| 2004/0210772 A1* | 10/2004 | Hooker | H04L 51/04 726/2 |
| 2005/0015593 A1* | 1/2005 | Cheng et al. | 713/168 |
| 2005/0114666 A1* | 5/2005 | Sudia | H04L 9/3236 713/175 |
| 2005/0193196 A1* | 9/2005 | Huang et al. | 713/166 |
| 2006/0037063 A1* | 2/2006 | Clemmons et al. | 726/4 |
| 2007/0033148 A1* | 2/2007 | Cahill | 705/65 |
| 2007/0198435 A1* | 8/2007 | Siegal et al. | 705/67 |
| 2008/0109362 A1* | 5/2008 | Fransdonk | G06Q 30/06 705/51 |

(Continued)

*Primary Examiner* — Sarah Su
(74) *Attorney, Agent, or Firm* — Shun Yao; Park, Vaughan, Fleming & Dowler LLP

(57) ABSTRACT

One embodiment of the present invention provides a system that facilitates determining an identity of a third-party user in a Security Assertion Markup Language (SAML) implementation of a web-service. During operation, the system receives an SAML token profile web service request from the third-party user at the web-service. The system also receives a digital certificate designated by the SAML token profile web service request from the third-party user at the web-service. Next, the system analyzes the digital certificate to identify a third-party associated with the third-party user. The system then determines if the third-party is a trusted party. Next, the system receives one or more attributes associated with the third-party user at the web-service. The system then uses the attributes to identify the third-party user. Finally, the system performs a lookup in a user map to determine a user account that is associated with the third-party user.

17 Claims, 3 Drawing Sheets

(56) References Cited

U.S. PATENT DOCUMENTS

| | | | |
|---|---|---|---|
| 2008/0120697 A1* | 5/2008 | Beyer | H04L 63/0869 726/4 |
| 2008/0244722 A1* | 10/2008 | Satish et al. | 726/9 |
| 2009/0150981 A1* | 6/2009 | Amies | H04L 63/102 726/5 |
| 2009/0178129 A1* | 7/2009 | Cross et al. | 726/10 |
| 2009/0193267 A1* | 7/2009 | Chung | H04L 9/0836 713/193 |
| 2009/0254392 A1* | 10/2009 | Zander | 705/7 |
| 2013/0254865 A1* | 9/2013 | Koster | G06F 21/51 726/10 |

* cited by examiner

DETERMINING AN IDENTITY OF A THIRD-PARTY USER IN AN SAML IMPLEMENTATION OF A WEB-SERVICE

BACKGROUND

Field of the Invention

Embodiments of the present invention relate to enterprise computing systems. More specifically, embodiments of the present invention relate to a method and an apparatus for determining an identity of a third-party user in a Security Assertion Markup Language (SAML) implementation of a web-service.

Related Art

Enterprise applications are increasingly moving towards a service-oriented architecture, and are exposing their functionality through web services. This migration is due in part to an increasing need for applications to integrate seamlessly in a heterogeneous customer environment. Moreover, it is desirable for these applications to provide a way to securely conduct operations involving their functionality.

The WS-Security (Web Service Security) standard defines a framework which facilitates ensuring the validity and integrity of these web service operations. In particular, the Security Assertion Markup Language (SAML) is one of the token profiles which is supported by the WS-Security standard. However, a Public Key Infrastructure (PKI)-based implementation of SAML (which does not involve a third-party assertion authority) requires a trust relationship to be established between web service consumer and producer using digital certificates. However, a PKI-based implementation only helps to validate the source and destination of the web service message, and does not help to ensure the identity of the user indicated in the WS-Security header. This is a problem because a different user might spoof the web service request coming from a trusted node at the origin. To the producer, the request is still valid since the request is originating from a trusted node. Hence, the producer processes the request, and in doing so trusts the identity of the user that sent the request.

This same problem exists when two sites (a first site and a second site) trust a producer and the second site spoofs the request with user information from the first site (assuming user information from the first site is public information, such as an email address, or is known or easily predictable).

This problem of verifying that a user is whom he declares to be is known as the identity proofing problem, and has existed in browser-based authentication systems for a long time. For browser-based applications, identity proofing is addressed through variety of knowledge-based authentication approaches, ranging from prompting a user with verification questions which are unique to the user, to dynamic questions which are based on a recent history of the user.

However, with web services, the nature of the transactions can be asynchronous and the system cannot rely on the user to respond to these knowledge-based questions in a timely manner.

SUMMARY

One embodiment of the present invention provides a system that facilitates determining an identity of a third-party user in a Security Assertion Markup Language (SAML) implementation of a web-service. During operation, the system receives an SAML token profile web service request from the third-party user at the web-service. The system also receives a digital certificate designated by the SAML token profile web service request from the third-party user at the web-service. Next, the system analyzes the digital certificate to identify a third-party associated with the third-party user. The system then determines if the third-party is a trusted party. Next, the system receives one or more attributes associated with the third-party user at the web-service. The system then uses the attributes to identify the third-party user. Finally, the system performs a lookup in a user map to determine a user account that is associated with the third-party user.

In some embodiments of the present invention, the system receives a registration for the third-party user at the web-service. The system also receives the one or more attributes associated with the third-party user at the web-service. Next, the system creates the user account. Finally, the system adds an entry into the user map associating the user account with the third-party user.

In some embodiments of the present invention, an identifier for the user account is obfuscated from the third-party user.

In some embodiments of the present invention, the one or more attributes associated with the third-party user can be of a different type than one or more attributes associated with a second third-party user.

In some embodiments of the present invention, the one or more attributes may include at least one of: a third-party user ID; an email address; a phone number; a birth date; a Social Security Number; and a personal certificate.

In some embodiments of the present invention, the system receives a web-service request from the third-party user at the web-service. If the third-party is a trusted party and if the user account associated with the third-party user has permission to execute the web-service request, the system executes the web-service request.

In some embodiments of the present invention, the web-service request is encrypted with the digital certificate.

DETAILED DESCRIPTION

Figure 1:
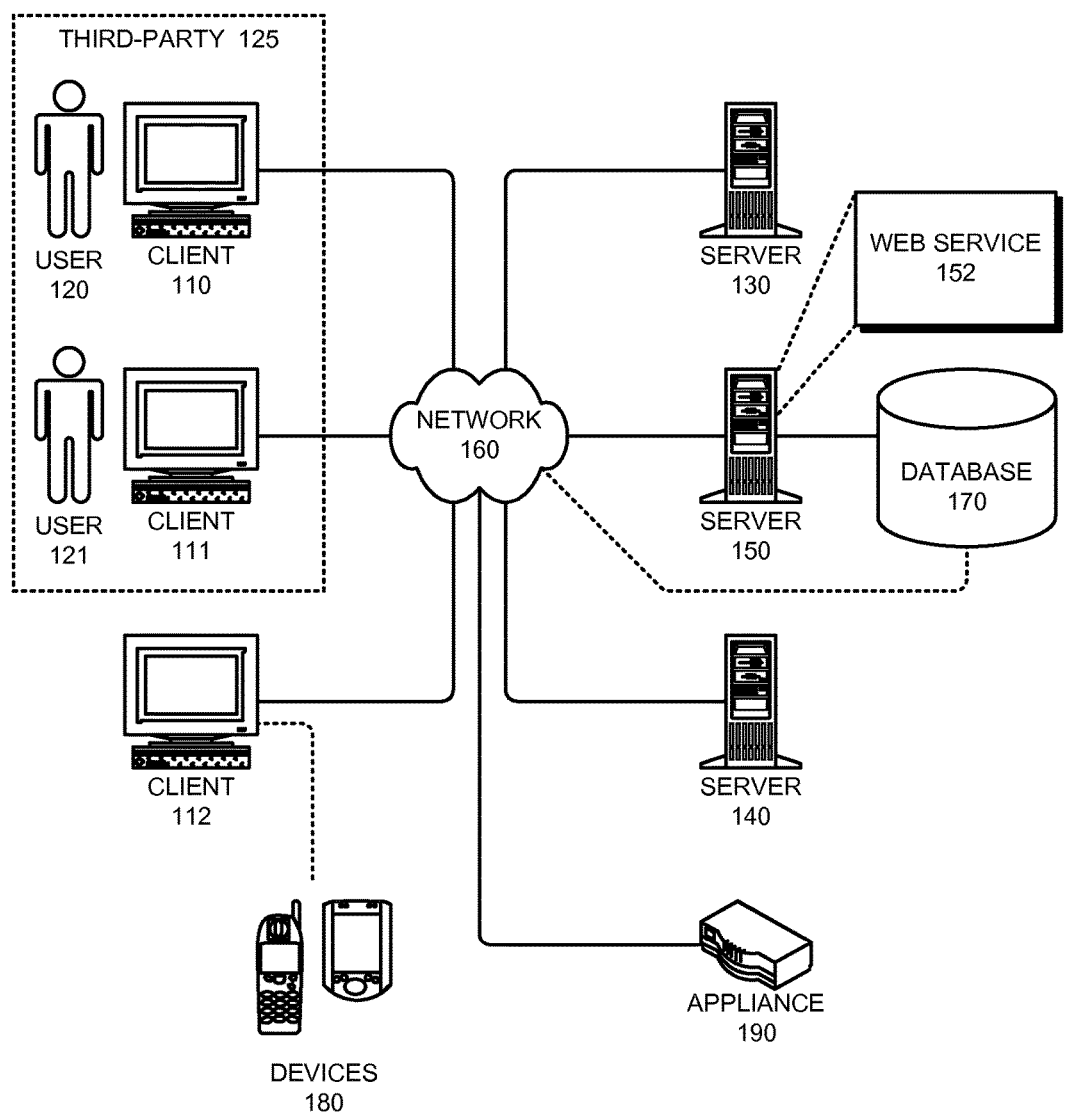
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

Overview

One embodiment of the present invention provides a system that facilitates determining an identity of a third-party user in a Security Assertion Markup Language (SAML) implementation of a web-service. During operation, the system receives an SAML token profile web service request from the third-party user at the web-service. The system also receives a digital certificate designated by the SAML token profile web service request from the third-party user at the web-service. Next, the system analyzes the digital certificate to identify a third-party associated with the third-party user. The system then determines if the third-party is a trusted party. Next, the system receives one or more attributes associated with the third-party user at the web-service. The system then uses the attributes to identify the third-party user. Finally, the system performs a lookup in a user map to determine a user account that is associated with the third-party user.

Note that embodiments of the present invention verify that a user and an associated request originate from a trusted site, and that the user from the trusted site is a trusted user. Web service producers need an equivalent of "knowledge based authentication" to verify that the user who sent in the SAML header is indeed the user indicated in the SAML header.

Some embodiments of the present invention achieve this identification by performing the following operations:

First, the system maps (or ties) a user identified by an identifier received within an SAML header to a consumer, and then registers this mapping information with the producer. As a result, the producer site, after verifying the validity and integrity of the request, verifies if the user is in fact associated with the producer site. Note that this prevents the problem of a trusted consumer from a second site spoofing a trusted consumer of a first site and gaining access to un-authorized data. Also note that mapping of potential users from a consumer site may be accomplished by associating a producer's PKI keys to each user in the producer database.

Moreover, note that the first step above prevents an external site from spoofing the web service request; however, it does not address the problem of spoofing from within the same consumer site. A consumer site may have several users who would invoke a web service request; however, each user might have different permissions, and hence, might be allowed to pull different authorized content from the producer. Note that it may be possible, due to a combination of vulnerability and security holes that might exist on the consumer site, for a user with lower permissions to spoof the web service request for a user with higher permissions before sending the web service request to the producer. Since both the users are registered with the producer, and the request is from a trusted node, the producer would process the request and respond accordingly.

In order to eliminate the above problem, the consumer site can map a unique identity of the user to a particular site key. This unique identifier can be mapped to a real user on the producer site as part of the registration process. As a result, the system can have two users from the same consumer sending in web service requests concurrently. However, for the first user, the unique identifier may be an email ID which is mapped to a real user on the producer, and for the second user, the unique identifier might be a phone number which is mapped to a real user on the producer. This approach makes it harder to find the identifier that a user is presently using to identify itself to the producer.

In some embodiments of the present invention, the system receives a registration for the third-party user at the web-service. The system also receives the one or more attributes associated with the third-party user at the web-service. Next, the system creates the user account. Finally, the system adds an entry into the user map associating the user account with the third-party user.

Note that the system may use more than one attribute to map the third-party user to the user account. Mapping multiple attributes in this way can further strengthen the security of the authentication system.

In some embodiments of the present invention, an identifier for the user account is obfuscated from the third-party user. In these embodiments, the third-party user never knows his local user ID.

In some embodiments of the present invention, the one or more attributes associated with the third-party user can be of a different type than one or more attributes associated with a second third-party user. As mentioned previously, for the first user, the unique identifier may be an email ID, and for the second user, the unique identifier might be a phone number. If a user is unaware of which attribute is being used for authentication, it is more difficult for a user to spoof another user.

In some embodiments of the present invention, the one or more attributes may include at least one of: a third-party user ID; an email address; a phone number; a birth date; a Social Security Number; and a personal certificate. Note that virtually any identifying attribute that may be stored in the third-party system can be used. Note that embodiments of the present invention are not intended to be limited to the attributed listed here. These attributes are provided solely for illustrative purposes.

In some embodiments of the present invention, the system receives a web-service request from the third-party user at the web-service. If the third-party is a trusted party and if the user account associated with the third-party user has permission to execute the web-service request, the system executes the web-service request.

In some embodiments of the present invention, the web-service request is encrypted with the digital certificate. Note that any type of encryption or authentication methods may be used with embodiments of the present invention.

Some embodiments of the present invention apply to non-J2EE-based (Java 2 Platform, Enterprise Edition) applications. Some J2EE applications provide minimal infrastructure for address some identity proofing issues; however, they are deficient, and they do not work with non-J2EE applications. In contrast, some embodiments of the present invention work equally well with J2EE, non-J2EE, and cross-platform applications, and provide a robust solution for solving identity proofing problems.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network.

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Web service 152 executes on server 150. Note that web service 152 can include any type of service for executing requests from applications and/or users. Additionally, web service 152 can be implemented in any programming language, whether the language is compiled or interpreted.

Users 120 and 121 can include: an individual; a group of individuals; an organization; a group of organizations; a computing system; a group of computing systems; or any other entity that can interact with computing environment 100.

In some embodiments of the present invention, clients 110 and 111, and users 120 and 121 are part of third-party 125.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different configurations, and are not limited to the configuration illustrated in computing environment 100.

Determining an Identity of a Third-Party User

Figure 2:
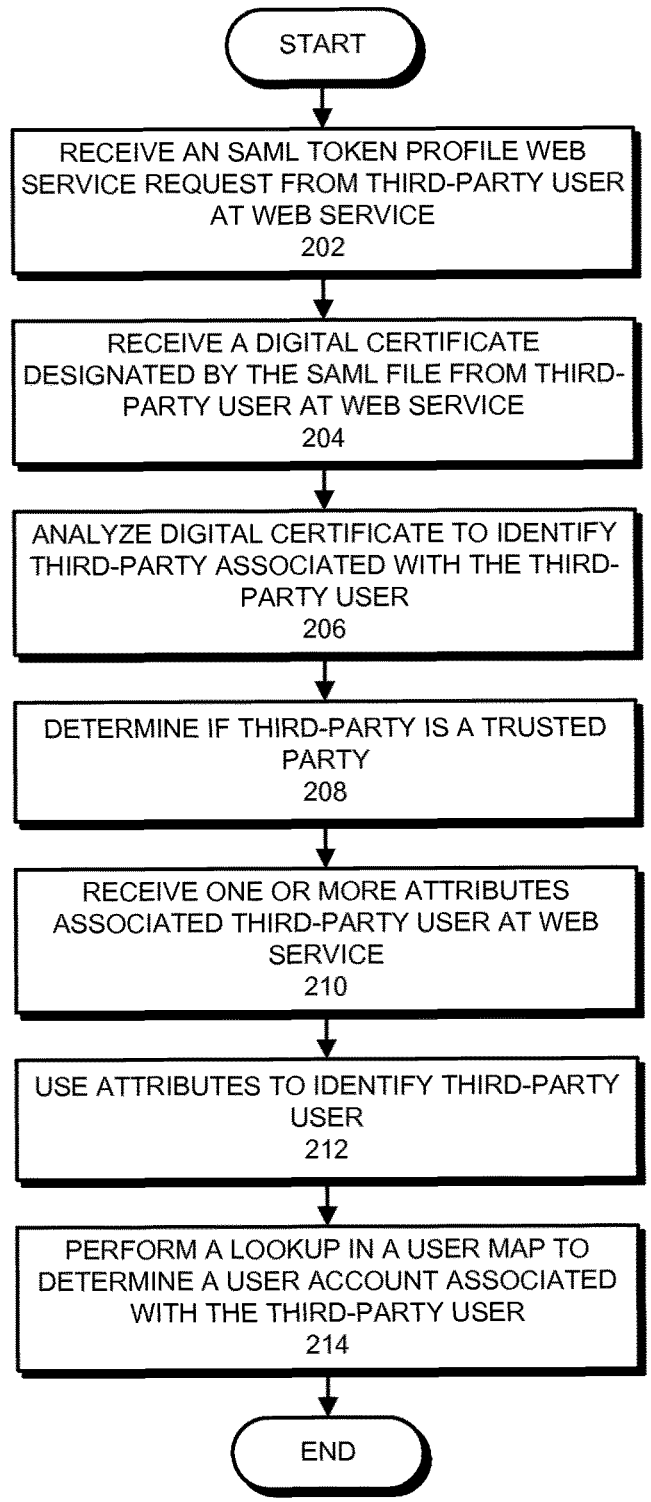
FIG. 2 presents a flowchart illustrating the process of determining an identity of a third-party user in an SAML implementation of a web-service in accordance with an embodiment of the present invention.

FIG. 2 presents a flowchart illustrating the process of determining an identity of a third-party user in an SAML implementation of a web-service in accordance with an embodiment of the present invention. During operation, web service 152 receives an SAML token profile web service request from user 120 (operation 202). Web service 152 also receives a digital certificate designated by the SAML token profile web service request from user 120 (operation 204). Next, web service 152 analyzes the digital certificate to identify third-party 125, which is associated with user 120 (operation 206). Web service 152 then determines if third-party 125 is a trusted party (operation 208).

Next, web service 152 receives one or more attributes associated with user 120 (operation 210). Web service 152 then uses the attributes to identify user 120 (operation 212). Finally, web service 152 performs a lookup in a user map to determine a user account that is associated with user 120 (operation 214).

Registering a Third-Party User

Figure 3:
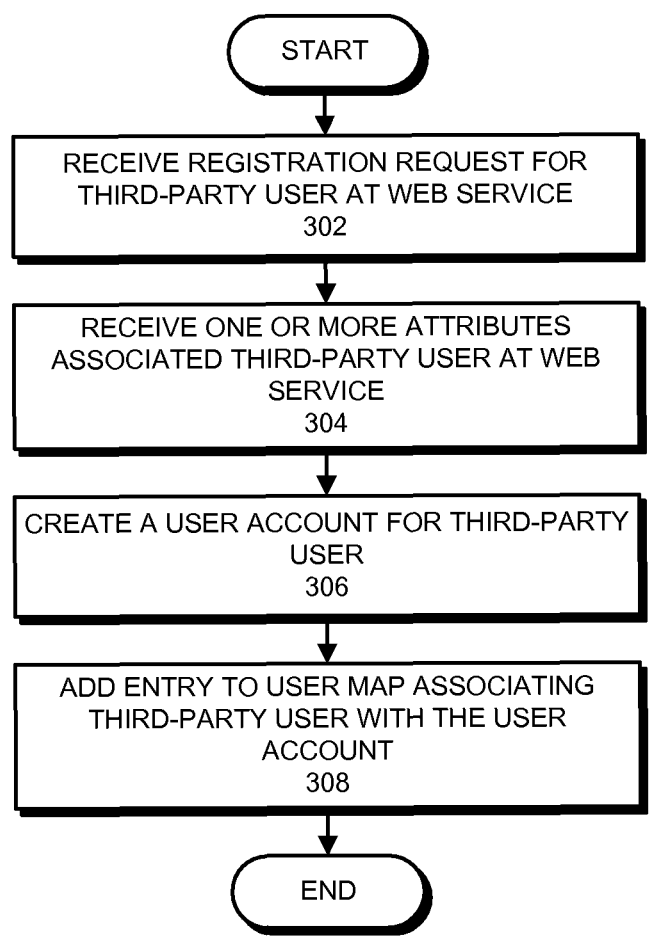
FIG. 3 presents a flowchart illustrating the process of registering a third party user in accordance with an embodiment of the present invention.

FIG. 3 presents a flowchart illustrating the process of registering a third party user in accordance with an embodiment of the present invention.

During operation, web service 152 receives a registration request for user 120 (operation 302). Furthermore, web service 152 receives one or more attributes associated with user 120 (operation 304). Next, web service 152 creates a user account for user 120 (operation 306). Finally, web service 152 adds an entry into a user map associating user 120 with the user account (operation 308).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining an identity of a user of a third-party service, the method comprising:
receiving a web-service request at a web-service, which is distinct from the third-party service, from a first user of the third-party service;
identifying a third-party server, which provides the third-party service, to the first user, based on a digital certificate received from the third-party server;
determining whether the third-party service is a trusted party based on the digital certificate received from the third-party server;
receiving, at the web-service, a plurality of identifying attributes of the first user, wherein a respective attribute of the plurality of identifying attributes comprises information about the first user;
verifying, for the web service, a user account associated with the first user by performing a lookup in a user map based on the plurality of identifying attributes;
determining whether the user account has permission to execute the web-service request; and in response to the third-party service being a trusted party and the user account having a permission for the web-service request, executing the web-service request.

2. The method of claim 1, further comprising:
receiving a registration request for creating the user account at the web-service, wherein the registration request comprises the plurality of identifying attributes for the first user;
creating the user account at the web-service; and
adding an entry to the user map, which maps the user account to the plurality of identifying attributes of the first user.

3. The method of claim 1, further comprising:
generating an identifier uniquely identifying the first user at the web-service; and
obfuscating the identifier from the first user.

4. The method of claim 1, wherein the plurality of identifying attributes includes one or more of:
a third-party service user ID;
an email address;
a phone number;
a birth date;
a Social Security number; and
a personal certificate.

5. The method of claim 1, wherein the web-service request is encrypted with the digital certificate.

6. The method of claim 1, further comprising:
receiving a second web-service request, at the web-service, from a second user of the third-party service;
receiving at the web-service a plurality of identifying attributes of the second user, wherein a respective attribute of the plurality of identifying attributes of the second user comprises information about the second user, and wherein a first attribute in the plurality of identifying attributes of the second user is distinct from a second attribute in the plurality of identifying attributes of the first user;
verifying, for the web service, a second user account associated with the second user by performing a lookup in the user map based on the plurality of identifying attributes of the second user, thereby allowing user accounts to be looked up based on different sets of identifying attributes.

7. A non-transitory computer-readable storage medium storing instructions that when executed by a computer cause the computer to perform a method for determining an identity of a user of a third-party service, the method comprising:
receiving a web-service request, at a web-service distinct from the third-party service, from a first user of the third-party service;
identifying a third-party server, which provides the third-party service to the first user, based on a digital certificate received from the third-party server;
determining whether the third-party service is a trusted party based on the digital certificate received from the third-party server;
receiving, at the web-service, a plurality of identifying attributes of the first user, wherein a respective attribute of the plurality of identifying attributes comprises information about the first user;
verifying, for the web service, a user account associated with the first user by performing a lookup in a user map based on the plurality of identifying attributes;
determining whether the user account has permission to execute the web-service request; and
in response to the third-party service being a trusted party and the user account having a permission for the web-service request, executing the web-service request.

8. The non-transitory computer-readable storage medium of claim 7, wherein the method further comprises:
receiving a registration request for creating the user account at the web-service, wherein the registration request comprises the plurality of identifying attributes for the first user;
creating the user account at the web-service; and
adding an entry to the user map, which maps the user account to the plurality of identifying attributes of the first user.

9. The non-transitory computer-readable storage medium of claim 7, wherein the method further comprises:
generating an identifier uniquely identifying the first user at the web-service; and
obfuscating the identifier from the first user.

10. The non-transitory computer-readable storage medium of claim 7, wherein the plurality of identifying attributes includes one or more of:
a third-party service user ID;
an email address;
a phone number;
a birth date;
a Social Security number; and
a personal certificate.

11. The non-transitory computer-readable storage medium of claim 7, wherein the web-service request is encrypted with the digital certificate.

12. The non-transitory computer-readable storage medium of claim 7, wherein the method further comprises:
receiving a second web-service request, at the web-service, from a second user of the third-party service;
receiving at the web-service a plurality of identifying attributes of the second user, wherein a respective attribute of the plurality of identifying attributes of the second user comprises information about the second user, and wherein a first attribute in the plurality of identifying attributes of the second user is distinct from a second attribute in the plurality of identifying attributes of the first user;
verifying, for the web service, a second user account associated with the second user by performing a lookup in the user map based on the plurality of identifying attributes of the second user, thereby allowing user accounts to be looked up based on different sets of identifying attributes.

13. An apparatus configured to determine an identity of a user of a third-party service, comprising:
a receiving mechanism configured to receive a web-service, which is distinct from the third-party service, request for a web service, from a first user of the third-party service;
an analysis mechanism configured to:
identify a third-party server, which provides the third-party service to the first user, based on a digital certificate received from the third-party server; and
determine whether the third-party service is a trusted party based on the digital certificate received from the third-party server;
wherein the receiving mechanism is further configured to receive a plurality of identifying attributes of the first user, wherein a respective attribute of the plurality of identifying attributes comprises information about the first user; and a lookup mechanism configured to:
  verify, for the web service, a user account associated with the first user by performing a lookup in a user map based on the plurality of identifying attributes;
  determine whether the user account has permission to execute the web-service request; and
  in response to the third-party service being a trusted party and the user account having a permission for the web-service request, execute the web-service request.

14. The apparatus of claim 13,
wherein the receiving mechanism is further configured to receive a registration request for creating the user account at the web-service, wherein the registration request comprises the plurality of identifying attributes for the first user; and
wherein the apparatus further comprises:
  a creation mechanism configured to create the user account at the web-service; and
  a mapping mechanism configured to add an entry to the user map, which maps the user account to the plurality of identifying attributes of the first user.

15. The apparatus of claim 13, further comprising an identification mechanism configured to:
  generate an identifier uniquely identifying the first user at the web-service; and
  obfuscate the identifier from the first user.

16. The apparatus of claim 13, wherein the plurality of identifying attributes includes one or more of:
  a third-party service user ID;
  an email address;
  a phone number;
  a birth date;
  a Social Security number; and
  a personal certificate.

17. The apparatus of claim 13, further comprising:
wherein the receiving mechanism is further configured to:
  receive a second web-service request, at the web-service, from a second user of the third-party service;
  receive, at the web-service, a plurality of identifying attributes of the second user, wherein a respective attribute of the plurality of identifying attributes of the second user comprises information about the second user, and wherein a first attribute in the plurality of identifying attributes of the second user is distinct from a second attribute in the plurality of identifying attributes of the first user; and
wherein the lookup mechanism configured to verify, for the web service, a second user account associated with the second user by performing a lookup in a user map based on the plurality of identifying attributes of the second user, thereby allowing user accounts to be looked up based on different sets of identifying attributes.

* * * * *